United States Patent

Aiduck et al.

[15] 3,702,941

[45] Nov. 14, 1972

[54] ZERO CROSSING POINT SWITCHING CIRCUIT

[72] Inventors: Carl Joseph Aiduck, North Palm Beach; Ronald Alfred Mancini, Lake Park, both of Fla.

[73] Assignee: RCA Corporation

[22] Filed: June 14, 1971

[21] Appl. No.: 152,815

[52] U.S. Cl. ....307/133, 317/11 A

[51] Int. Cl. ....H01h 9/56

[58] Field of Search.....307/133, 130, 136; 317/11 A; 219/115

[56] References Cited

UNITED STATES PATENTS 3,555,292 1/1971 Henry....307/133

3,562,628 2/1971 Barber....307/133 X 3,486,038 12/1969 Skamfer et al....307/133

3,557,381 1/1971 Henry....307/133

*Primary Examiner*—Robert K. Schaefer

*Assistant Examiner*—William J. Smith

*Attorney*—H. Christoffersen

[57] ABSTRACT

A switching circuit which is utilized to switch a.c. loads in electrical equipment as a function of the a.c. line signal. The switching circuit is switched to supply the line signal to the load at the zero-crossover points of the line signal whereby radio frequency interference generated by switching the a.c. load is reduced.

10 Claims, 1 Drawing Figure

PATENTED NOV 14 1972
3,702,941
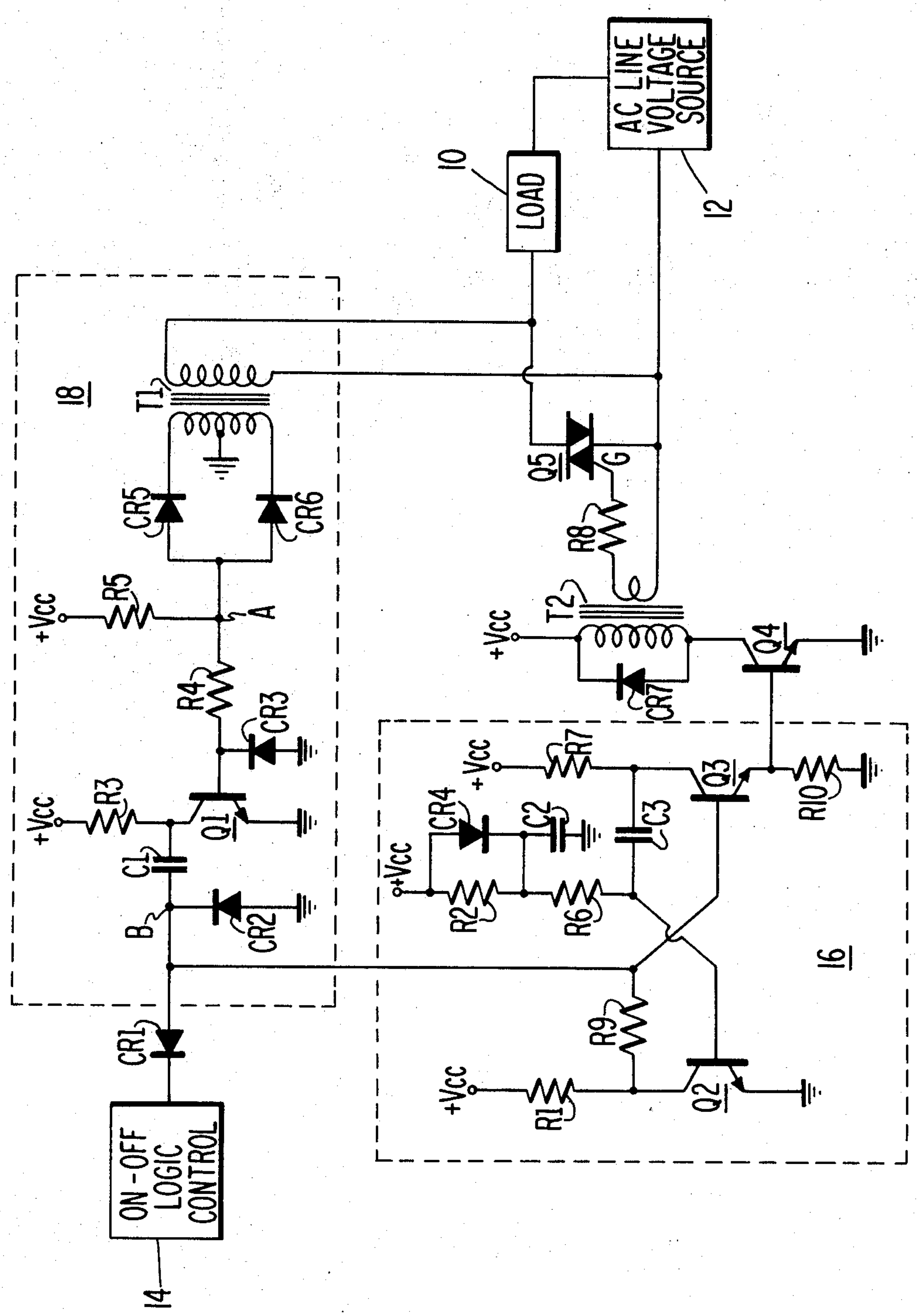
INVENTORS
Carl J. Aiduck and
Ronald A. Mancini
BY J. Donald Weber, Jr.
ATTORNEY

ZERO CROSSING POINT SWITCHING CIRCUIT

BACKGROUND OF THE INVENTION

The radio frequency interference (RFI) generated by the random switching of alternating current devices is a critical parameter in determining the overall reliability of low signal level systems. In order to reduce the RFI level within a system, the technique of switching the a.c. loads at the zero-voltage crossover of the a.c. line signal has become widely accepted. Many a.c. line switch networks, including discrete and integrated circuit devices, are known in the art. However, the present state of the art switches, i.e., discrete or integrated circuit devices, have one or more deficiencies. Typically, the existing devices exhibit excessive gate dissipation in the thyristor switching element. In addition, the existing devices generally are unable to reliably drive loads of arbitrary or time varying phase angle or to drive loads exhibiting wide ranges of load currents. Furthermore, in the existing devices there is generally no isolation between d.c. ground and a.c. neutral.

SUMMARY OF THE INVENTION

In one embodiment of the invention, a transformer senses the a.c. line signal across a thyristor from which the zero-voltage and zero-current crossover points of the a.c. line signal can be determined. The transformer supplies the signal to a zero-cross detector network. The zero-cross detector produces appropriate signals at the zero-crossover points of the signal. The signals from the zero-cross detector are supplied to a wave-shaping network such as a one-shot multivibrator. The wave-shaping network supplies a signal to the thyristor to selectively energize the thyristor. When the thyristor is energized, the a.c. line signal is supplied to a load device. Thus, the critical crossover points of the line signal (at which points gate trigger signals should be applied to the thyristor to provide reduced RFI operation) are utilized to control the switching circuit whereby switching of the line signal to the load device occurs substantially at the crossover points.

BRIEF DESCRIPTION OF THE DRAWING

The sole FIGURE is a schematic diagram of one embodiment of the instant invention.

DESCRIPTION OF ONE EMBODIMENT OF THE INVENTION

Referring now to the single drawing, a suitable a.c. line voltage source 12 has one terminal thereof connected to a typical load 10. Although not limited thereto, load 10 may be a motor or the like for driving a card reader or sorter system or the like. Source 12 may supply a suitable line signal, for example, (but not limited to) 110 volts, 60 Hz or the like. Another terminal of load 10 is connected to one terminal of the primary winding of transformer T1 and to one main terminal of thyristor Q5. Typically, thyristor Q5 may be a triac which permits bidirectional conduction therethrough. The specific type of thyristor is determined as a function of the line signal and the load current requirements.

The other main terminal of thyristor Q5 and the other terminal of the primary winding of transformer T1 are connected together and to the opposite side (i.e., neutral) of source 12. The gate electrode of thyristor Q5 is connected to one terminal of the secondary winding of transformer T2 via resistor R8. The other terminal of the secondary winding of transformer T2 is returned to the neutral side of source 12 and the second mentioned main terminal of thyristor Q5.

The conduction status of thyristor Q5 is, as is well known in the art, controlled by the gate (or trigger) signal which is supplied to gate electrode G of thyristor Q5. If it is initially assumed that thyristor Q5 is non-conductive, and that the conductive reactance of the primary winding of transformer T1 is extremely high, (for example the inductance of the primary winding may be on the order of 100 Hys.) little or no load current is supplied to load 10 by source 12. Consequently, load 10 remains relatively inoperative. However, when thyristor Q5 is rendered conductive by the application of a trigger signal to electrode G, a relatively large load current exists in the circuit including thyristor Q5 and load 10 whereby the load is rendered operative.

In order to control the conduction of thyristor Q5, and to assure that a trigger signal is applied thereto during an appropriate portion of the input signal cycle, the input signal is supplied to the zero-cross detector circuit 18. The output of zero-cross detector 18 is connected to one-shot multivibrator 16 which selectively supplies signals to thyristor Q5. In particular, the input signal is supplied across the primary winding of transformer T1 of zero-cross detector 18. A secondary winding of transformer T1 is center-tapped to ground. The opposite ends of the secondary winding are connected to the cathodes of diode CR5 and CR6, respectively. The anodes of diodes CR5 and CR6 are connected together and to node A. Node A is the intersection between resistors R4 and R5. The other side of resistor R5 is connected to a suitable source $+V_{cc}$. The other terminal of resistor R4 is connected to the base electrode of transistor Q1. In addition, diode CR3 has the anode thereof connected to ground and the cathode thereof connected to the base of transistor Q1. Thus, diode CR3 effectively limits the negative voltage at the base of transistor Q1 to protect this transistor from malfunction. In addition, the emitter of NPN transistor Q1 is connected to ground while the collector thereof is connected to the source $+V_{cc}$via resistor R3.

The secondary winding of transformer T1 and the associated diodes CR5 and CR6 operate as a full-wave rectifier network. Thus, a full-wave rectified signal varying between 0 and −V volts is provided at node A. The negative peak value (i.e., −V volts) of the full-wave rectified signal is a function of the amplitude of the input signal supplied by source 12 and the turns ratio of the windings of transformer T1. These parameters are determined as a function of the voltage $+V_{cc}$ and the values of resistors R4 and R5, as will become evident.

In essence, the full-wave rectified signal which is supplied to node A, varies from 0 to −V volts. When the signal at node A is at −V volts, diode CR3 effectively clamps the base of transistor Q1 and supplies current to resistor R4. In addition, source $+V_{cc}$ supplies current through resistor R5. These currents are summed and passed through the respective diode CR5 or CR6, which is rendered operative by the application of the input signal. That is, one of the diodes will be forward biased and the other diode will be reverse biased by the signals at the terminals of the secondary winding during most of the input signal cycle.

However, when the input signal is at a zero-crossover, the voltage at node A, as supplied by the rectifier network, reaches the zero level. When the voltage at node A is at 0 volts, diodes CR5 and CR6 are essentially zero biased and pass little or no current therethrough. Moreover, diode CR3 is also reverse biased. Consequently, the signal supplied to the base of transistor Q1 causes this transistor to be rendered conductive. When transistor Q1 is conductive, the potential at the collector electrode thereof switches abruptly to the relatively low voltage level of approximately ground (ignoring voltage drops across transistor Q1).

As the voltage at node A switches toward the negative level $-V$, diode CR5 or CR6 is forward biased and transistor Q1 is rendered nonconductive. At this time, the voltage at the collector electrode of transistor Q1 switches abruptly to the relatively positive potential as defined by source $+V_{cc}$. Thus, transistor Q1 tends to produce a narrow pulse at the collector electrode thereof. However, the combination of resistor R3 and capacitor C1 operates as a differentiating network whereby positive-going and negative-going spike-like signals are produced thereacross. The positive spike is produced by the positive-going edge of the narrow pulse produced by transistor Q1 while the negative spike signal is produced by the negative-going edge of the narrow pulse produced by transistor Q1. The differentiated signal is supplied to node B which is connected to the cathode of diode CR2. The anode of diode CR2 is connected to ground. Thus, diode CR2 operates to clamp the differentiated signal, whereby the negative-going spikes are effectively removed from the circuit. Consequently, only the positive-going spikes are detected at node B.

Diode CR1 has the anode thereof connected to node B and the cathode thereof connected to on-off logic control unit 14. Control unit 14 is any external circuitry which may be utilized to control the operation of the line switch described herein. Thus, if control circuit 14 produces a relatively positive output signal, diode CR1 is blocked and the positive-going spike signals at node B are transmitted to the remainder of the circuit, as described hereinafter. However, if control circuit 14 produces a relatively negative signal, diode CR1 is forward biased and the positive spike signals at node B are clamped thereby.

If it is assumed that logic control circuit 14 is presenting an "off" signal, diode CR1 is forward biased and the positive spike signals at node B are clamped thereby. Thus, no signals are supplied to the base of transistor Q3. Conversely, a relatively positive signal is supplied from source $+V_{cc}$ via resistors R2 and R6 to the base of transistor Q2. The emitter of transistor Q2 is connected to ground while the collector thereof is returned to the source $+V_{cc}$ by resistor R1 and further connected to node B and to the base of transistor Q3 via coupling resistor R9. In addition, the base of transistor Q2 is connected via coupling capacitor C3 to the collector of transistor Q3, which is further connected to the source $+V_{cc}$ via resistor R7. The emitter electrode of transistor Q3 is connected to ground via resistor R10 and to the base of transistor Q4, as described hereinafter.

In typical operation, with an "off" or negative signal supplied by circuit 14, a relatively positive signal is supplied via resistors R2 and R6 to the base of transistor Q2, which is thus rendered conductive. When transistor Q2 is conductive, a relatively negative signal is supplied to the base of transistor Q3 via resistor R9, whereby transistor Q3 is nonconductive. If transistor Q3 is nonconductive, capacitor C3 is charged by source $+V_{cc}$ via resistor R7. Moreover, the net effect of one-shot multivibrator circuit 16 is to remain inactive and not produce an output signal at the emitter of transistor Q3 until positive spikes on the base of transistor Q3 trigger the one-shot multivibrator.

In addition, diode CR4 has the anode thereof connected to source $+V_{cc}$ and the cathode thereof connected to the common junction between resistors R2 and R6 as well as to one side of capacitor C2. The other side of capacitor C2 is connected to ground. In essence, diode CR4 provides a fast charging path and a slow discharging path for capacitor C2 whereby transistor Q2 can be saturated in the conductive condition during turn-on or turn-off of the d.c. power supply. Without this fast charging and slow discharging network, the multivibrator network comprising transistors Q2 and Q3 could possibly produce a spurious trigger signal in response to the turning-on or turning-off of the d.c. power.

If now, the signal supplied by source 14 is an "on" or very positive signal whereby diode CR1 is reverse biased, the positive-going spikes at node B will be supplied to the base of transistor Q3. The positive-going spike signal will render transistor Q3 conductive whereby capacitor C3 is discharged therethrough and a relatively negative signal is supplied to the base of transistor Q2 until capacitor C3 is recharged via resistors R2 and R6. When capacitor C3 is recharged, a positive signal is supplied to the base of transistor Q2 whereby transistor Q2 is again conductive and a relatively negative signal is supplied to the base of transistor Q3, which is then nonconductive. Thus, the time constant T for the duration of the signal produced by the one-shot is a function of the values of capacitor C3 and resistors R2 and R6.

While transistor Q3 is conductive, a relatively positive signal is supplied to the base of transistor Q4 which has the emitter thereof connected to ground and the collector thereof connected to one terminal of the primary winding of transformer T2. The other terminal of the primary winding of transformer T2 is returned to source $+V_{cc}$. The positive signal at the base thereof renders transistor Q4 conductive. When transistor Q4 is conductive, a signal is generated in the primary winding of transformer Q4. This signal is coupled to the secondary winding of transformer T2 and, thus, to the gate electrode G of thyristor Q5 via resistor R8.

The signal which is supplied to the gate electrode G of thyristor Q5 when transistor Q3 and transistor Q4 are conductive is defined to be sufficient to render thyristor Q5 conductive. Moreover, the time constant T, defined supra, for the signal supplied by one-shot 16 is established as a function of the time required for the thyristor to have reached the latching current thereof.

When the latching current is achieved, removal of the gate trigger signal will not cause the thyristor to be turned off. In addition, the RL time constant defined by resistor R8 and the secondary winding of transformer T2 is properly chosen to assure that the signal at gate electrode G has sufficient duration to permit thyristor Q5 to latch. Thus, one-shot 16 supplies a signal of sufficient amplitude and duration to drive the RL circuit of transformer T2 and resistor R8 and the RL circuit operates to sustain the signal from the one-shot. Consequently, thyristor Q5 will now remain conductive until the load signal supplied by source 12 reaches a zero-current crossover at which time thyristor Q5 will turn off even if the trigger pulse at terminal G is terminated.

However, when thyristor Q5 turns off at the zero-current crossover, the voltage thereacross suddenly attempts to reach the voltage level of the input or a.c. line signal. Depending upon the phase relationship of the voltage and current in the load/line signal, this instantaneous voltage may be quite large. This voltage signal is applied across the primary winding of transformer T1 which is part of the rectifying network described supra. As a result, the voltage at node A approaches the $-V$ volts level whereby transistor Q1 is rendered nonconductive, as previously described. When transistor Q1 switches to the nonconductive condition, a positive-going spike signal is produced at node B. The positive-going spike signal is supplied to one-shot multibivrator (i.e., at the base of transistor Q3) and causes another trigger signal to be supplied to electrode G whereby thyristor Q5 is again rendered conductive and load 10 is energized. Thus, load operation is not interrupted or switched except at the zero-current crossover part of the a.c. line signal.

The primary winding of transformer T2 is connected between source $+V_{cc}$ and the collector of transistor Q4. In addition, the cathode of diode CR7 is connected to source $+V_{cc}$ and the anode thereof is connected to the collector of transistor Q4. Thus, diode CR7 is connected in parallel with the primary winding of transformer T2 and provides a current path for the large current generated by the collapsing field when an energizing signal is removed from the primary winding of transformer T2. Thus, diode CR7 protects transistor Q4 from damage due to the large voltage generated by the collapsing field.

Thus, there is shown and described a circuit wherein RFI problems are minimized. By minimizing RFI problems, reductions in noise generated signals are effected. In some applications these noise signals could conceivably produce spurious signals which are detected and operated upon in the associated system.

In essence, the line switch described herein includes a zero-crossover detector which detects the zero-crossover points of the input signal and produces other signals which control the operations of a one-shot multivibrator. The multivibrator controls a thyristor-type element which is connected in series with the line signal source and the load. Inasmuch as the thyristor is, essentially, activated at the crossover points of the line signal, the load is effectively energized at the crossover points as well. Since the load is energized at the crossover points, a relatively large surge signal is not suddenly applied to the load. Consequently, the generation of sudden surge signals is avoided.

Moreover, the zero detector network incorporates a transformer which provides isolation between the d.c. ground and the a.c. neutral signals. This isolation prevents any noise on the a.c. neutral line from being applied to the d.c. power distribution network and reducing system performance. Moreover, this isolation technique reduces possibly safety hazards associated with connecting the d.c. ground and the a.c. neutral system and provides circuit isolation required in many applications.

Furthermore, as suggested supra, the circuit is able to detect both zero-voltage crossovers when the thyristor is off and zero-current crossovers when the thyristor is on. Consequently, only short duration trigger pulses need to be provided at these critical crossover timing points. Moreover, and of important significance, the circuit operation provides that after the thyristor has been initially turned on at the zero-voltage point, gate triggering is thereafter automatically synchronized with the zero-current crossovers. By synchronizing with the zero-current crossovers, the circuit provides reliable triggering independent of the phase angle of the load and independent of a time varying phase angle such as encountered in capacitive start motor. This operation is not possible with known circuits which use only the zero-crossover points of the a.c. line signal.

Thus, the advantages of this network over known networks in the art are readily apparent. The one embodiment described herein, while a preferred embodiment, is not intended to be limitative of the invention. Rather, modifications which fall within the purview of the description are intended to be included herein as well. For example, it is possible to drive thyristor Q5 directly from transistor Q3 if noise and signal isolation provided by transformer T2 are not required. Also, transformer T1 and associated diodes CR5 and CR6 may be replaced by a simple diode bridge if the aforementioned isolation is not required. This type of circuit arrangement is included within the scope of the appended claims.

What is claimed is:

1. A switching network comprising:

load means, source means supplying an alternating voltage;

switch means for selectively connecting said source means to said load means, said switch means becoming an open circuit when the current flowing therethrough decreases to zero amplitude;

zero-cross detector means coupled across said switch means for initially detecting the zero-crossover points of the alternating voltage supplied by said source means when the switch means is opened, and thereafter detecting a voltage transition occurring when said switch means opens as the result of the zero-crossover of the alternating current flowing through said switch means; and signal generating means connected to supply signals to initially close said switch means in response to the detection of zero-crossover points of the alternating voltage by said zero-cross detector means and thereafter to supply signals to close said switch in response to the detection of the voltage transition occuring as a result of the zero-crossover of the alternating current flowing through said switch means.

2. The switching network recited in claim 1 including control means for selectively disabling said signal generating means.

3. The switching network recited in claim 1 wherein said zero-cross detector means includes rectifier means for initially producing a full-wave rectified signal from the alternating voltage established across said switch means by said source means when said switch means is open, and thereafter receiving the voltage transition occuring when said switch means opens as a result of the zero-crossover of the alternating current flowing through said switch means, pulse generating means, an current steering means for selectively supplying current to said pulse generating means as a function of the amplitude of the rectified signal produced by said rectifier means such that said pulse generating means selectively generates a pulse.

4. The switching network recited in claim 1 wherein said switch means includes a thyristor.

5. The switching network recited in claim 4 wherein said thyristor is a trigger operated device capable of bidirectional current conduction when triggered by a suitable signal.

6. The switching network recited in claim 3 including means for clamping the pulses supplied by said pulse generating means.

7. The switching network recited in claim 4 wherein said thyristor is connected to receive a trigger signal from said signal generating means, said signal generating means comprises one-shot multivibrator circuit means, said one-shot multivibrator circuit means supplies a signal of sufficient time duration to assure that said thyristor achieves a self-sustaining latching current therethrough.

8. A switching network comprising triggerable switch means for conducting bidirectional current in the presence of a triggering signal, said switch means becoming an open circuit when the current flowing therethrough decreases to zero amplitude, a.c. voltage source means, load means connected to said source means and to said switch means in order to receive said a.c. voltage from said source means when said switch means is triggered, rectifier means coupled across said switch means in order initially to receive the a.c. voltage established across said switch means by said source means when said switch means is opened and to produce a full-wave rectified signal from the a.c. voltage received by said rectifier means, and thereafter to receive a voltage transition occuring when said switch means opens as a result of the zero-crossover of the alternating current flowing through said switch means, pulse producing means connected to said rectifier means in order to initially produce pulses in substantial synchronism with the zero amplitude points of said full-wave rectified signal from said rectifier means when said switch means is open, and thereafter to produce pulses in substantial synchronism with the voltage transition occuring when said switch means opens as a result of the zero-crossover of the alternating current flowing through said switch means, one-shot multivibrator means connected to receive said pulses from said pulse producing means and to produce the trigger signal in substantial synchronism with said pulses, and circuit means for supplying said trigger signal from said one-shot multivibrator means to said triggerable switch means.

9. The switching network recited in claim 8 including first transformer means connected across said switch means to receive the a.c. voltage established across said switch means, said first transformer means further connected to said rectifier means to couple the a.c. voltage thereto, and said circuit means includes second transformer means for coupling said trigger signal from said one-shot multivibrator means to said triggerable switch means said first and second transformer means providing isolation between said a.c. voltage source means and said switching network.

10. The switching network recited in claim 8 wherein said pulse producing means includes differentiating means such that the pulses are connected to spike-like signals of opposite polarity, and clamping means for clamping spike-like signals of one polarity.

* * * * *